United States Patent [19]

Ohno

[11] Patent Number: 5,368,905
[45] Date of Patent: Nov. 29, 1994

[54] HEAT-SENSITIVE INDICATOR

[75] Inventor: Shigemi Ohno, Saitama, Japan

[73] Assignee: Nichiyu Giken Kogyo Co., Ltd., Saitama, Japan

[21] Appl. No.: 14,239

[22] Filed: Feb. 5, 1993

[51] Int. Cl.$^5$ .................. B29D 22/00; B29D 23/00
[52] U.S. Cl. .................. 428/34.1; 428/35.7; 428/36.5; 428/138; 428/195; 428/913; 428/914; 426/88; 368/327; 374/160
[58] Field of Search ............ 428/195, 204, 207, 913, 428/914, 34.1, 138, 35.7, 36.5; 426/88; 436/2; 368/327; 374/160

[56] References Cited

U.S. PATENT DOCUMENTS

| | | | |
|---|---|---|---|
| 2,560,537 | 7/1951 | Andersen | 116/219 |
| 2,951,764 | 9/1960 | Chase | 426/88 |
| 3,055,759 | 9/1962 | Busby et al. | 99/192 |
| 3,242,733 | 2/1966 | Johnson | 374/102 |
| 3,243,303 | 3/1966 | Johnson | 426/88 |
| 3,362,834 | 1/1968 | Kaye | 99/192 |
| 3,479,877 | 11/1969 | Allen et al. | 374/106 |
| 3,521,489 | 7/1970 | Finkelstein et al. | 73/358 |
| 3,751,382 | 8/1973 | Ljungberg et al. | 435/12 |
| 3,954,011 | 5/1976 | Manske | 374/102 |
| 4,292,916 | 10/1981 | Bradley et al. | 116/205 |
| 4,793,717 | 12/1988 | Manske | 374/160 |
| 5,053,339 | 10/1991 | Patel | 436/2 |
| 5,058,088 | 10/1991 | Haas et al. | 368/327 |
| 5,180,598 | 1/1993 | Jozefowicz | 426/88 |

FOREIGN PATENT DOCUMENTS

| | | |
|---|---|---|
| 51-33432 | 9/1976 | Japan . |
| 59-164929 | 9/1984 | Japan . |
| 61-13116 | 1/1986 | Japan . |
| 61-013116 | 1/1986 | Japan . |
| 62-197486 | 9/1987 | Japan . |
| 1323833 | 7/1973 | United Kingdom . |

OTHER PUBLICATIONS

French Search Report (dated Nov. 2, 1993) and Annex (dated Nov. 2, 1993), for FA 483660, FR 9302214.

Primary Examiner—Patrick J. Ryan
Assistant Examiner—William A. Krynski
Attorney, Agent, or Firm—Sughrue, Mion, Zinn, Macpeak & Seas

[57] ABSTRACT

In the heat-sensitive indicator herein disclosed, a colored heat-fusible substance 3 is accommodated in an inner hollow portion of a projection 1 which is formed from a film collapsible by application of an external pressure such as a finger-pressure. The opening of the hollow portion is sealed with a thin cover 9 collapsible through the application of the foregoing pressure. An An absorber 7 in which the colored heat-fusible substance 3 in the molten state can permeate is arranged outside the thin cover 9 of the hollow portion. The colored heat-fusible substance 3 is supported by a carrier 5 and accommodated in the interior of the hollow portion of the projection 1. A space in which the carrier is dropped when the thin cover 9 is broken through the application of a pressure is formed, behind the thin cover 9, by a hollow ring 11. The carrier 5 is positioned within the hollow ring 11, which forms the space outside the opening of the hollow portion and behind the thin cover 9 for the opening, and on the absorber 7. The carrier 5 serves to control the rate of permeation of the colored heat-fusible substance into the absorber and accordingly, stable permeation thereof into the absorber 7 can be ensured.

11 Claims, 4 Drawing Sheets

HEAT-SENSITIVE INDICATOR

BACKGROUND OF THE INVENTION

The present invention relates to a heat-sensitive indicator which gives an irreversible indication when the temperature of a desired subject exceeds a predetermined level and more specifically to a heat-sensitive indicator used for temperature-control in the fields of frozen foods and medical care products which require low temperature storage.

In the recent eating habits, a large number of frozen foods have frequently been used, but the frozen temperatures thereof largely differ from one another. An increase in the temperature thereof during transportation leads to quality reduction and proliferation of bacteria which, in turn, result in deterioration and rottenness. For this reason, severe conditions for temperature-control has been required for these frozen foods. In the field of medical care, the role of low temperature-control is very important for particular medicines, blood and specimens. In this case, if the temperature of these products increases, they likewise cause quality deterioration and in the worst case, they cannot be used.

As indicators for temperature-control of the foregoing foods and medical products for medical care, there have been known, for instance, time-temperature integrating monitors which undergo temperature histeresis phenomena such as those disclosed in Japanese Patent Provisional Publication Nos. 50-60262 and 51-33432; and temperature-time monitors which make use of microcapsules such as those disclosed in Japanese Patent Provisional Publication Nos. 61-13116 and 62-197486 as well as indicators which make use of capillary phenomena such as those disclosed in Japanese Patent Provisional Publication No. 59-164929.

It has been very difficult to use an indicator for low temperature-control since the temperature histeresis thereof is quite complicated. In case of the foregoing indicators for temperature-control, they are cooled prior to the use thereof and then the reaction thereof is initiated. However, most of them suffer from problems concerning the timing and mechanism for the initiation of the reaction. Moreover, substances used in these low temperature reactions have low storage stability and this often greatly affects the accuracy of the resulting indicators.

SUMMARY OF THE INVENTION

An object of the present invention is to provide an irreversible heat-sensitive indicator in which a reactive substance is stably stored before the initiation of the reaction thereof, whose reaction mechanism is very simple and which can substantially improve the accuracy of temperature-control.

According to the present invention, the foregoing object can effectively be accomplished by providing a heat-sensitive indicator wherein a colored heat-fusible substance is accommodated in an inner hollow portion of a projection which is formed from a film collapsible by the application of an external pressure such as a finger-pressure, an opening of the hollow portion is sealed with a thin cover collapsible through the application of the foregoing pressure and an absorber in which the fused colored heat-fusible substance in the molten state can penetrate through the thin cover is arranged outside the thin cover of the hollow portion. Upon using this heat-sensitive indicator, the heat-sensitive indicator is cooled to solidify the colored heat-fusible substance and then a pressure is applied onto the projection to collapse the thin cover and to thus drop the colored heat-fusible substance absorbed in a carrier on the absorber. Thereafter, the solidified colored heat-fusible substance is fused and permeated into the absorber as the temperature increases. The temperature can be estimated by determining the distance (permeation distance) of the colored heat-fusible substance permeated into the absorber. Alternatively, the indicator can detect temperatures falling within various ranges if the kinds of the heat-fusible substances used are variously changed.

DETAILED EXPLANATION OF THE INVENTION

Figure 1A:
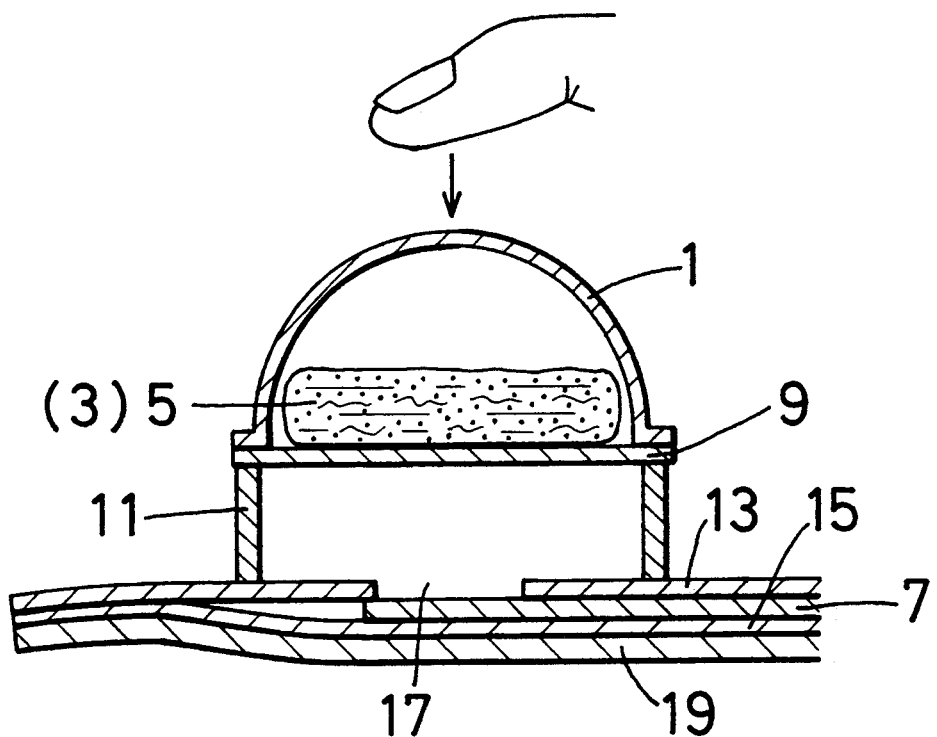
FIGS. 1A and 1B each is a cross sectional view of the essential part of an embodiment of the heat-sensitive indicator according to the present invention.

In the heat-sensitive indicator according to the present invention, a colored heat-fusible substance 3 is accommodated in the inner hollow portion of a projection 1 formed from a film collapsible by application of an external pressure such as a finger-pressure, as seen from FIG. 1A. An opening of the hollow portion is sealed with a thin cover 9 likewise collapsible through the application of the foregoing pressure. An absorber 7 in which the colored heat-fusible substance 3 in the molten state can penetrate through the thin cover 9 is arranged outside the thin cover 9 of the hollow portion.

The colored heat-fusible substance 3 is supported by a carrier 5 and the carrier 5 is accommodated within the inner hollow portion of the projection 1. A space in which the carrier 5 is dropped when the thin cover 9 is broken through the application of the pressure is formed, behind the thin cover 9 for the hollow portion, by a hollow ring 11.

The carrier 5 may be arranged outside the thin cover 9 for the opening of the hollow portion, inside the hollow ring 11 which forms the space behind the hollow portion and over the absorber 7. The carrier 5 serves to control the permeation rate of the colored heat-fusible substance 3 into the absorber 7 and accordingly stable permeation of the substance into the absorber 7 can be ensured. For this reason, the carrier 5 is not necessarily be enclosed in the hollow portion of the projection 1 and may be arranged inside the hollow ring 11 and over the absorber 7. The carrier 5 is preferably made from a material which can satisfactorily absorb the colored heat-fusible substance 3 and whose absorbing capacity is slightly lower than that of the absorber 7. Specific examples thereof include filter paper of glass fiber, filter paper for chromatography, pulp, pulverized filter paper and fine powdery silica gel, with the filter paper of glass fiber being particularly preferred.

The absorber 7 is preferably made from a material which can support the colored heat-fusible substance 3 and is capable of stable permeation of the substance. Examples of such materials are filter paper such as qualitative filter paper, quantitative filter paper, filter paper of glass fiber and filter paper for chromatography; and porous films comprising polytetrafluoroethylene resin fibers and silica gel. The foregoing materials may be optionally used in combination with coating agents to control the permeation rate of the absorber 7. Such coating agents may be any coating material so far as they can control the permeation rate of the absorber and it is desirable to use liquid silicones and adhesives for vinyl chloride resins.

The foregoing colored heat-fusible substance 3 is a mixture of a heat-fusible substance and a dye. The heat-fusible substance used as a principal ingredient of the colored heat-fusible substance 3 is not restricted to specific substances so far as they are fused at desired temperatures. Specific examples thereof include alcohols such as n-octyl alcohol, n-nonyl alcohol, n-decyl alcohol, n-lauryl alcohol, n-myristyl alcohol, n-cetyl alcohol, n-stearyl alcohol, oleyl alcohol, cyclohexanol, cyclopentanol, benzyl alcohol, cinnaunyl alcohol, ethylene glycol, polyethylene glycol, propylene glycol, trimethylolpropane, pentaerythritol and sorbitol; esters such as amyl acetate, octyl acetate, butyl propionate, ethyl caproate, amyl caprylate, ethyl caprate, octyl caprate, lauryl caprate, methyl laurate, octyl laurate, lauryl laurate, methyl myristate, hexyl myristate, stearyl myristate, butyl palmirate, myristyl palmirate, methyl stearate, ethyl stearate, lauryl stearate, butyl benzoate, amyl benzoate, phenyl benzoate, ethyl acetoacetate, methyl oleate, butyl acrylate, dibutyl oxalate, diethyl malonate, dibutyl tartrate, dimethyl sebacate, dibutyl phthalate, dioctyl phthalate, dibutyl fumarate, diethyl maleate, triethyl citrate, 1,2-hydroxystearic acid triglyceride, castor oil, methyl dioxystearate and methyl 1,2-hydroxystearate; aliphatic hydrocarbons such as pentadecane, tetradecane, hexadecane, 1-heptadecane and 1-octadecane; aromatic hydrocarbon compounds such as p-xylene and dodecylbenzene; ketones such as diethyl ketone, ethyl butyl ketone, methyl hexyl ketone, mesityl oxide, cyclohexanone, methyl cyclohexanone, acetophenone, benzophenone, acetonylacetone and diacetone alcohol; and ethers such as butyl ether, hexyl ether, diphenyl ether, dioxane, ethylene glycol dibutyl ether, diethylene glycol dibutyl ether, ethylene glycol diphenyl ether and ethylene glycol monophenyl ether. These compounds may be used alone or in any combination thereof.

The dye as another ingredient of the colored heat-fusible substance 3 may be any dye so far as they are soluble in the heat-fusible substance used and is not restricted to specific ones. The dyes may be, for instance, oil-soluble dyes, direct dyes, acid dyes, basic dyes, mordant dyes, sulfur dyes, sulfurized vat dyes, vat dyes, azoic dyes, dispersed dyes, reactive dyestuffs and oxidation colors. Optionally, pigments may likewise be used in the invention. Specific examples of oil-soluble dyes are Sudan IV available from Wako Pure Chemicals Industries, Ltd., Oil Red 5B and Oil Red RR available from Orient Chemical Industries, Ltd., Kayaset Red 802 available from Nippon Kayaku Co., Ltd., Oil Blue 603 and Oil Yellow GG available from Orient Chemical Industries, Ltd.

The projection 1 is formed from a film collapsible through the application of a mechanical pressure or a finger-pressure and the film may be formed from any material through which the heat-fusible substance cannot permeate and in which the substance can be held over a desired period of time. Examples thereof include polyvinyl chloride, polystyrene, anaxially oriented polypropylene, high density polyethylene, polyethylene terephthalate, polycarbonate, unoriented nylon, polyacrylonitrile and cellulose acetate. These materials may be used alone or in any combination thereof. The projection 1 has a size such that a desired amount of the colored heat-fusible substance 3 can be accommodated therein and has any shape which permits easy collapse of the thin cover 9 through the application of a pressure.

The thin cover 9 must hold the colored heat-fusible substance 3 and the carrier 5 and have a thickness which allows easy breakage thereof, with an aluminum film being preferred as such a thin cover.

The hollow ring 11 has a diameter almost identical to that of the projection 1 and a height sufficient for accommodating the carrier 5 having absorbed colored heat-fusible substance 3 within the ring. The hollow ring 11 can be formed from any material which can support the projection 1 and can be adhered thereto. Examples of such materials include polyethylene, polyvinyl chloride, polyester, Teflon and butadiene rubber.

The heat-sensitive indicator according to the present invention makes it possible to visually confirm if the temperature of a frozen food or a product for medical case is controlled to a predetermined level or range and in other words, it permits easy temperature-control of these products. Since the colored heat-fusible substance is sealed in the projection, the indicator has good storage stability and the reaction thereof can be initiated by simply pressing the projection. Moreover, the permeation rate of the substance can be controlled by the carrier and this leads to a substantial increase in the accuracy of the temperature-control.

The present invention will be explained in more detail with reference to preferred Embodiments, but the present invention is by no means limited to these specific Embodiments.

Figure 1B:
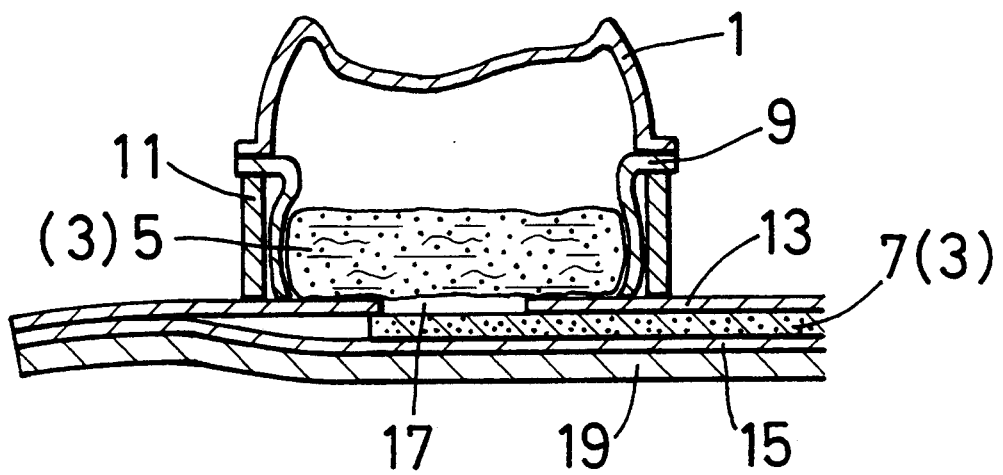
Figure 3:
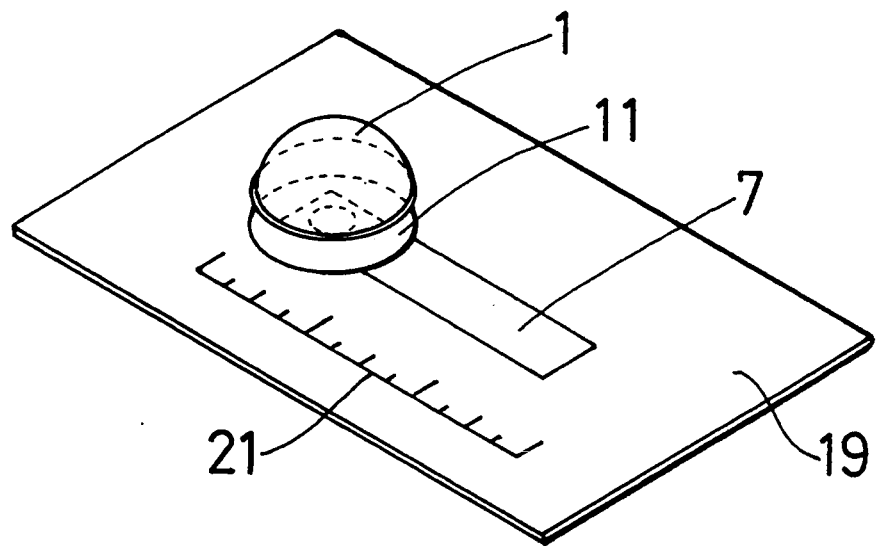
FIG. 3 is a perspective view of the indicator according to the present invention.

FIG. 3 is a perspective view of an embodiment of the heat-sensitive indicator according to the present invention and FIG. 1 is a cross sectional view of the essential part thereof. As seen from FIG. 3, the indicator generally comprises a ground paper 19, an absorber 7 positioned on the ground paper, a hollow ring 11 placed on one end of the absorber 7 and a projection 1 arranged on the hollow ring 11. A gradation 21 is marked out on the ground paper 19 for the determination of the permeation distance of the colored heat-fusible substance 3 permeated into the absorber 7.

As seen from FIG. 1A, the essential part of the indicator comprises the colored heat-fusible substance 3 which comprises a heat-fusible substance and a dye and the carrier 5 positioned within the projection 1, wherein the colored heat-fusible substance 3 is absorbed into the carrier 5. An opening of the projection 1 is sealed with an aluminum film 9. The hollow ring 11 having a diameter almost equal to that of the projection 1 is adhered to the aluminum film 9. The absorber 7 which absorbs the colored heat-fusible substance 3 extends from the central part of the bottom of the hollow ring 11 towards the outside thereof. The absorber 7 is sandwiched between two polyester films 13 and 15 and a hole 17 serving as an input portion is formed through the upper polyester film 13 so that the colored heat-fusible substance 3 can permeate into the absorber 7. The hole 17 is positioned at the central part of the bottom of the hollow ring 11 and on the one end of the absorber 7.

Figure 2:
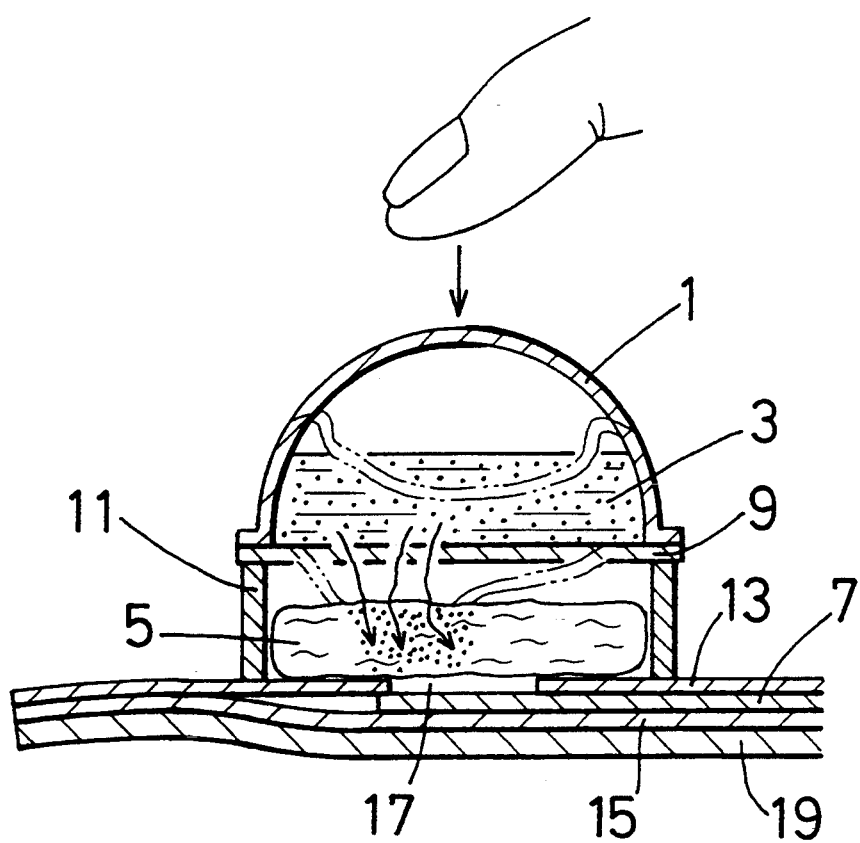
FIG. 2 is a cross sectional view of the essential part of another embodiment of the heat-sensitive indicator according to the present invention.

The following experiments were carried out using the heat-sensitive indicator having the aforementioned structure and it was confirmed that it gave a stable permeation distance at a predetermined temperature. In Experiments 1 to 3, a heat-sensitive indicator having a structure as shown in FIG. 1 were prepared and examined, while in Experiments 4 to 7, an indicator having a structure as shown in FIG. 2 were prepared and tested. Comparative Experiment corresponds to an indicator beyond the scope of the present invention.

Experiment 1

In this Experiment, a heat-sensitive indicator having the structure shown in FIG. 1 was prepared. First, a porous film (available from Uniflex Co., Ltd.) comprising fibrous polytetrafluoroethylene and silica gel was cut into a piece having a size of 0.5 cm × 6.0 cm and the piece was used as an absorber 7. The absorber 7 was sandwiched between a polyester sheet 13 having a thickness of 32 μm one side of which was coated with a sealing agent of polyethylene and a polyester film 15 having a thickness of 28 μm and a heat-sealed by heating the assembly to 120° C. Upon carrying out the heat-sealing, a hole 17 having a diameter of 4 mm φ was formed, in advance, through the upper polyester film 13. The hole 17 was positioned at one end of the absorber 7. Then a hollow ring 11 of a polyethylene having a height of 3 mm, an inner diameter of 9 mm φ and an outer diameter of 11 mm φ was adhered to the polyester film 13 through an adhesive layer so that the center thereof is in conformity with that of the hole 17. A colored heat-fusible substance 3 used was prepared by admixing 23.5 parts by weight of lauryl alcohol having a melting point of 23.4° C. as a heat-fusible substance, 26.5 parts by weight of decyl alcohol having a freezing point of 7.0° C. and then adding 0.1 part by weight of an oil-soluble dye, Sudan IV, to the mixture. Filter paper of glass fiber GA-200 (available from Toyo Filter Paper Co., Ltd.) was cut into a circular piece of 8 mm φ to give a carrier 5. A polyvinyl chloride was formed into a hemispherical shape having a diameter of 7.65 mm φ and a height of 4.25 mm to give a projection 1 and 0.1 g of the foregoing colored heat-fusible substance 3 and the carrier 5 were introduced into the projection 1. Then a lacquer was applied onto an aluminum film 9 and the opening of the projection 1 was covered with the aluminum film 9 through heat-sealing. Thereafter, the periphery of the projection 1 was stamped out with a punch having a diameter of 13 mm φ and the projection 1 was adhered to the hollow ring 11 through an adhesive layer while facing the aluminum film 9 downward to give a heat-sensitive indicator.

Figure 4:
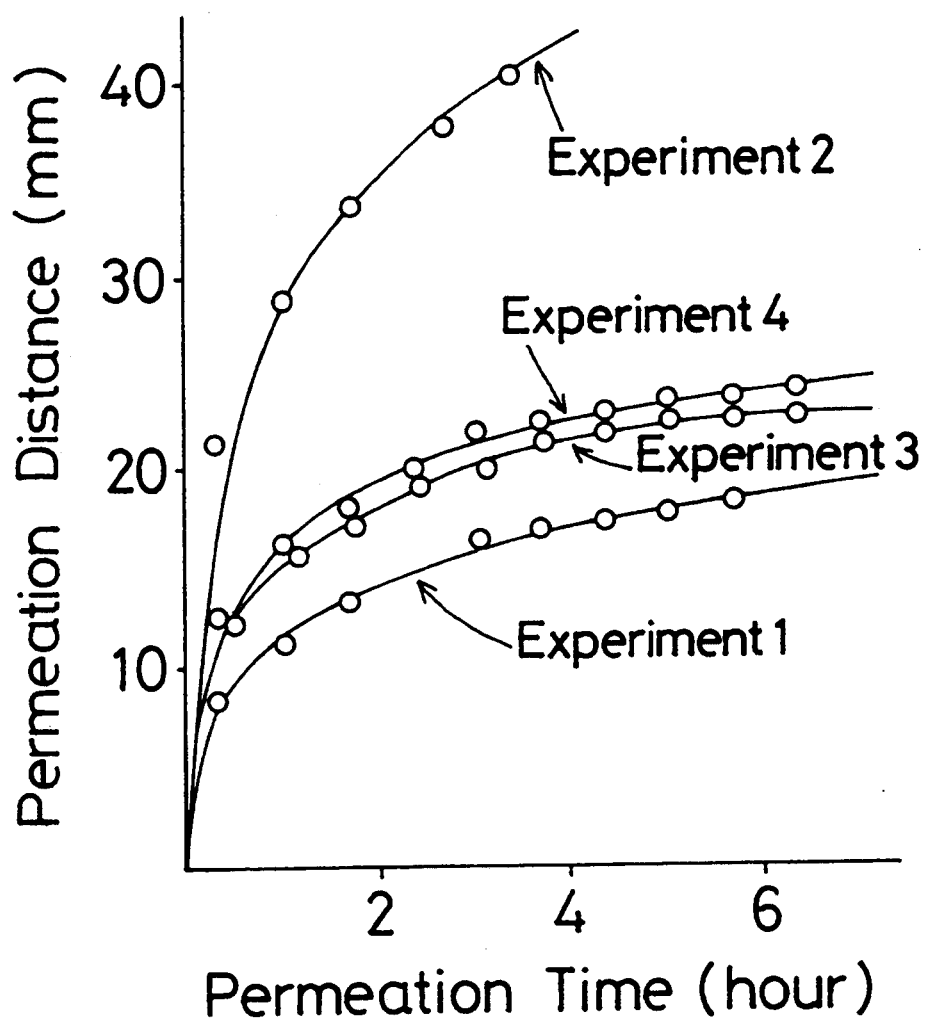
FIG. 4 is a graph on which the permeation distances of the products obtained in Experiments 1 to 4 are plotted against time.

The resulting heat-sensitive indicator was cooled to −16° C. for 3 hours to solidify the same. When the indicator was then inputted through pushing the top of the projection 1 with the tip of a finger, the aluminum film 9 was broken and the contents, i.e., the colored heat-fusible substance 3 and the carrier 5 fell on the bottom of the hollow ring 11. Subsequently, the inputted heat-sensitive indicator was introduced into a thermostatic chamber maintained at a temperature of 5° C. and the distance of the colored heat-fusible substance 3 permeated into the absorber 7 was observed. FIG. 4 shows the relation between the distance of the colored heat-fusible substance 3 permeated into the absorber 7 and time. This heat-sensitive indicator showed stable permeation without any scattering.

Experiment 2

The same procedures used in Experiment 1 were repeated except that 0.09 g of ashless pulp was used in the carrier 5 to give a heat-sensitive indicator and the distance of the colored heat-fusible substance permeated into the absorber 7 was determined. The results obtained are plotted on FIG. 4. In this case, stable permeation of the substance into the absorber was likewise observed without any scattering.

Experiment 3

The same procedures used in Experiment 1 were repeated except that the projection 1 was formed from a polystyrene, silica gel-containing filter paper was used as the absorber 7 and filter paper of glass fiber GA-200 having a diameter of 6 mm φ was used as the carrier 5 to give a heat-sensitive indicator and the distance was determined in the same manner used in Experiment 1. The results obtained are plotted on FIG. 4. In this case, stable permeation of the substance into the absorber was likewise observed without any scattering.

Experiment 4

In this Experiment, there was produced a heat-sensitive indicator having a structure as shown in FIG. 2 by positioning a carrier 5 within a hollow ring 11 and sealing only a colored heat-fusible substance 3 within a projection 1. The same materials for and sizes of every elements used in Experiment 1 were employed except that filter paper of glass fiber GA-200 having a diameter of 9 mm φ was used as the carrier 5. The resulting heat-sensitive indicator was cooled to −16° C. for 3 hours to solidify the same and then the top of the projection 1 was pressed with the tip of a finger to break the aluminum film 9 and to drop the content, i.e., the colored heat-fusible substance 3 on the carrier 5. Subsequently, the inputted heat-sensitive indicator was introduced into a thermostatic chamber maintained at a temperature of 5° C. and the distance of the colored heat-fusible substance 3 permeated into the absorber 7 was observed. The results thus obtained are plotted on FIG. 4. This heat-sensitive indicator also showed stable permeation without any scattering.

Experiment 5

The same procedures used in Experiment 4 were repeated except that a colored heat-fusible substance 3 used was prepared by mixing 22.9 parts by weight of lauryl alcohol having a melting point of 23.4° C. and 27.2 parts by weight of decyl alcohol having a freezing point of 7.0° C. and then adding 0.1 part by weight of Oil Red 5B as a dye to give a heat-sensitive indicator as shown in FIG. 2 and the permeation distance of the substance was determined in the same manner used in Experiment 4. The relation between the permeation distance and time was almost identical to that obtained in Experiment 4. In other words, stable permeation of the substance into the absorber was observed without any scattering.

Experiment 6

The same procedures used in Experiment 4 were repeated except that the kinds of the filter paper of glass fiber used as the carrier 5 were changed to GA-100, GF-75, GD-120 and GB-140 each having a diameter of 9 mm φ to give a heat-sensitive indicator having a structure as shown in FIG. 2 and the distance was determined in the same manner used in Experiment 4. The relation between the permeation distance and time was almost identical to that obtained in Experiment 4. In other words, stable permeation of the substance into the absorber was observed without any scattering.

Experiment 7

In this Experiment, a heat-sensitive indicator having a structure as shown in FIG. 2 was produced. An absorber was prepared by applying, to a thickness of 20 μm, RTV Rubber KE-3475T (available from Shin-Etsu Silicone Co., Ltd.) onto filter paper for chromatography (ADVANTEC 514-A; available from Toyo Filter Paper Co., Ltd.), drying and cutting into pieces of 0.5 cm × 3.0 cm. The resulting product was used as a material for permeation according to the procedures used in Experiment 1. Filter paper of glass fiber GA-200 having a diameter of 9.2 mm φ (available from Toyo Filter Paper Co., Ltd.) serving as a carrier was positioned at a permeation-initiating portion. A colored heat-fusible substance 3 used herein was prepared by mixing 20.0 parts by weight of pelargonic acid having a melting point of 15° C. as a heat-fusible substance and 0.02 part by weight of an oil-soluble dye: Oil Blue 5B and then filtering. A polyvinyl chloride film having a thickness of 200 μm was formed into a hemispherical shape having a diameter of 8.8 mm φ and a height of 6.0 mm to give a projection 1. The heat-fusible substance 3 (115 μl) was poured into the projection 1 and the opening of the projection 1 was sealed, through heat-sealing, with a film of 15 μm thickness obtained by applying a lacquer material onto an aluminum film. Thereafter, the periphery of the projection 1 was stamped out with a punch having a diameter of 13 mm φ and the projection 1 was adhered to the hollow ring 11 through an adhesive layer while facing the aluminum film downward to give a heat-sensitive indicator.

Figure 5:
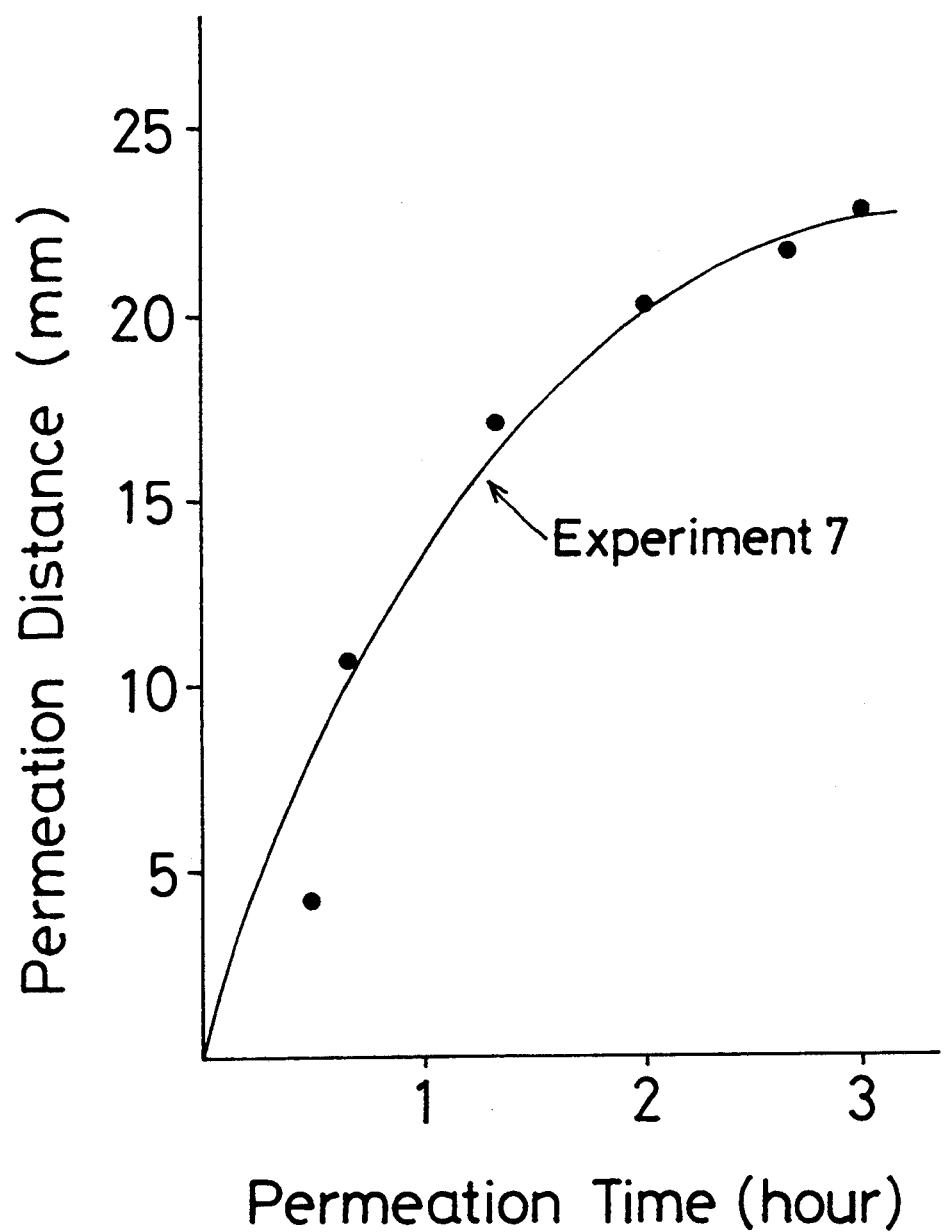
FIG. 5 is a graph showing the relation between the permeation distance and time observed in Experiment 7.

The resulting heat-sensitive indicator was cooled to −16° C. for 3 hours to solidify the same. The indicator was then introduced into a thermostatic chamber maintained at a temperature of 0° C. and inputted by quickly pushing the top of the projection 1 with the tip of a finger. Thus, the aluminium film 9 was broken and the contents, i.e., the colored heat-fusible substance 3 and the carrier 5 fell on the absorber. Subsequently, the temperature of the thermostatic chamber was raised up to 11° C. and the distance of the colored heat-fusible substance 3 permeated into the absorber 7 was determined. FIG. 5 shows the relation between the distance of the colored heat-fusible substance 3 permeated into the absorber 7 and time. This heat-sensitive indicator showed stable permeation without any scattering.

Comparative Experiment

A microcapsule of a colored heat-fusible substance was prepared using the following ingredients according to the coacervation method:

| | |
|---|---|
| gelatin | 6 parts by weight |
| gum arabic | 6 parts by weight |
| heat-fusible substance (4:1 mixture of lauryl alcohol and decyl alcohol) | 30 parts by weight |
| oil-soluble dye | 1.8 parts by weight |
| diluent water (containing 0.1 part by weight of a surfactant Themol NL available from Kao Corporation) | 210 parts by weight |
| dispersant (Starhome DOS available from Nippon Oil and Fats Co., Ltd) | 0.05 part by weight |
| emulsifying agent (Nonion E-215 available from Nippon Oil and Fats Co., Ltd.) | 0.21 part by weight |
| stabilizer | |
| carboxymethyl cellulose | 1.5 parts by weight |
| water | 30 parts by weight |
| formalin | 3.18 parts by weight |

After forming the microcapsule from the foregoing ingredients, sodium alginate and cellulose floes were added to the microcapsule and then the mixture was formed into an ink-like product in a mortar. The resulting ink was applied onto a label to a thickness of 180 μm, dried followed by putting filter paper for chromatography (available from Whatmann Company) serving as an absorber on the label, cooling the assembly and subjecting to a pressing test. As a result, it was confirmed that the microcapsule was destroyed when a pressure of 37 kg/cm² was applied to the assembly. However, there was observed only a slight change, with time, in the developed color.

The heat-sensitive indicator according to the present invention can be used in the temperature-control for frozen foods and products for medical care. The indicator of the present invention makes it possible to easily and visually confirm if the temperature of the products such as frozen foods falls within a predetermined range. Moreover, since a colored heat-fusible substance is accommodated in a projection, it has good storage stability and the reaction can be initiated by simply pressing the projection.

What is claimed is:

1. A heat-sensitive indicator wherein a colored heat-fusible substance is accommodated in an inner hollow portion of a projection which is formed from a film collapsible by application of an external pressure such as a finger-pressure, an opening of the hollow portion is sealed with a cover collapsible through the application of the foregoing pressure, and an absorber, the absorber extending to an area outside of the hollow portion, in which the colored heat-fusible substance in the molten state can penetrate through the cover and together with a carrier permeate into the area outside of the cover of the hollow portion.

2. The heat-sensitive indicator of claim 1 wherein the colored heat-fusible substance is supported by a carrier and accommodated in the inner hollow portion of the projection and wherein a space in which the carrier is dropped when the cover is collapsed through the application of the pressure is formed behind the thin cover.

3. The heat-sensitive indicator of claim 1 wherein a carrier capable of absorbing the colored heat-fusible substance in the molten state is arranged within the space formed below the hollow portion and behind the thin cover for sealing the opening of the hollow portion and the absorber in which the colored heat-fusible substance absorbed on the carrier can permeate when it is converted into the molten state is positioned below the space.

4. The heat-sensitive indicator of any one of claims 1 to 3 wherein the colored heat-fusible substance is a mixture of a heat-fusible substance and a dye.

5. The heat-sensitive indicator of any one of claims 1 to 3 wherein the carrier is filter paper of glass fiber.

6. The heat-sensitive indicator of any one of claims 1 to 3 wherein the absorber is a porous film comprising fibers of polytetrafluoroethylene resin and silica gel.

7. The heat-sensitive indicator of any one of claims 1 to 3 wherein the absorber is filter paper.

8. The heat-sensitive indicator of claim 4 wherein the carrier is filter paper of glass fiber.

9. The heat-sensitive indicator of claim 1 wherein the colored heat-fusible substance is a mixture of a heat-fusible substance and a dye, and the absorber is a porous film comprising fibers of polytetrafluoroethylene resin and silica gel.

10. The heat-sensitive indicator of claim 1 wherein the colored heat-fusible substance is a mixture of a heat-fusible substance and a dye, and the absorber is filter paper.

11. A heat-sensitive indicator of claim 1 wherein a gradation scale is marked out for determination of the permeation distance of the colored heat-fusible substance into the absorber in a direction outside the thin cover of the hollow portion.

* * * * *